(12) United States Patent
Lee, Jr.

(10) Patent No.: US 9,267,704 B1
(45) Date of Patent: Feb. 23, 2016

(54) PORTABLE HEATER HOUSING

(71) Applicant: Procom Heating, Inc., Brea, CA (US)

(72) Inventor: Joseph B. Lee, Jr., Bowling Green, KY (US)

(73) Assignee: PROCOM HEATING, INC., Brea, CA (US)

( * ) Notice: Subject to any disclaimer, the term of this patent is extended or adjusted under 35 U.S.C. 154(b) by 313 days.

(21) Appl. No.: 13/751,052

(22) Filed: Jan. 26, 2013

Related U.S. Application Data

(60) Provisional application No. 61/591,184, filed on Jan. 26, 2012.

(51) Int. Cl.
*F23D 11/04* (2006.01)
*F24H 3/02* (2006.01)

(52) U.S. Cl.
CPC ...................................... *F24H 3/02* (2013.01)

(58) Field of Classification Search
CPC ......... F24H 3/02; F24H 3/025; F24H 3/0488; F24H 9/0063; F24H 9/0068; F24H 9/1881; Y02B 30/28
See application file for complete search history.

(56) References Cited

U.S. PATENT DOCUMENTS

| | | | |
|---|---|---|---|
| 2,405,427 | A | 9/1941 | Holthouse |
| 2,552,492 | A | 5/1951 | Nathan |
| 3,073,583 | A | 1/1963 | Woollen, Jr. |
| 3,101,193 | A | 8/1963 | Varvel |
| 3,150,656 | A | 9/1964 | Huber |
| 3,256,003 | A | 6/1966 | Briggs |
| 3,319,947 | A | 5/1967 | Truesdell |
| 3,364,917 | A | 1/1968 | Woollen, Jr. |
| 3,393,903 | A | 7/1968 | Berglund, Jr. |
| 3,883,290 | A | 5/1975 | Windelbandt |
| 3,998,581 | A | 12/1976 | Hemingway et al. |
| 4,309,978 | A | 1/1982 | Hensiek et al. |
| 4,340,362 | A | 7/1982 | Chalupsky et al. |
| 4,729,829 | A | 3/1988 | Duggins |
| 4,942,863 | A | 7/1990 | Chou et al. |
| 5,476,378 | A | 12/1995 | Zagoroff et al. |

FOREIGN PATENT DOCUMENTS

JP   56133872   10/1981

*Primary Examiner* — Alfred Basichas
(74) *Attorney, Agent, or Firm* — Middleton Reutlinger (57) ABSTRACT

A portable forced air unit is provided with an elongated housing. A portion of the housing may include a divergent section or expansion area in the direction of the forced air flow of the unit. The airflow cooling channel defined within the divergent section increases in size in the direction of flow. The divergent section may have one or more apertures therethrough. The divergent section may be positioned adjacent the fuel source. A converging area or outlet section of the housing may taper in the direction of air flow of the unit. The taper of the housing outlet section may be a variety of shapes. The airflow cooling channel defined within the outlet section reduces in size in the direction of flow.

20 Claims, 11 Drawing Sheets

PORTABLE HEATER HOUSING

CROSS-REFERENCE TO PRIOR APPLICATION

This application claims priority to and benefit under 35 U.S.C. 119(e) to currently U.S. Provisional Application Ser. No. 61/591,184, filed on Jan. 26, 2012, which is incorporated herein by reference.

TECHNICAL FIELD

The present invention relates to portable space heaters in particular to a space heater with a housing having a discharge end.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The portable forced air heating unit 10 depicted in the drawings provides for a radiant heat blocker 20 that reduces the radiant heat emitting from the outlet end of the heater in a predetermined direction while minimizing the effect on the heated force air exiting the heating unit 10.

Kerosene forced air heaters conventionally include a housing, a burner head assembly mounted within the housing, and an air blower system within the housing behind the burner head assembly. Fuel (kerosene, fuel oil, or diesel fuel, etc.) is conveyed to the burner head assembly and combustion chamber assembly. The blower supplies combustion air to the burner head assembly and forces hot combustion gases from the burner head assembly while cooling the exterior of the burner head assembly and combustion chamber assembly. Although a kerosene forced air heater is shown in detail it is understood that the embodiments of the invention may be used in any type of portable forced air heater such as, but not limited to, a gas or multi-fuel forced air heater.

As shown in FIGS. 1-5D, there is one embodiment of a portable forced air heating unit 10 within which a radiant heat blocker 20 is utilized. Unit 10 includes a fuel tank assembly 70, an elongated housing 50 superposed upon the fuel tank assembly 70, and a controls compartment 60 disposed between so as to join the housing 50 to fuel tank assembly 70. Housing 50 includes a combustion chamber assembly 40, described herein, within which a mixture of fuel and air is burned, and the fuel tank assembly 70 contains a reservoir or tank 74 of fuel for burning within the combustion chamber assembly. Routed through controls compartment 60 between fuel tank assembly 70 and housing 50 is a fuel line 81 and air line 82 and appropriate controls whose structure and function are well-known in the art are associated with the housing 50 and fuel tank assembly 70 for controlling the heater operation. It should also be understood that the controls compartment 60 may be located or mounted in any number of positions and be a variety of dimensions, shapes, quantities, and construction. Further, additional components may be included in the unit such as the type shown in U.S. application Ser. No. 12/186,110 filed Aug. 5, 2008 and entitled LOW PRESSURE FORCED AIR HEATER, which is herein incorporated by reference.

Figure 3:
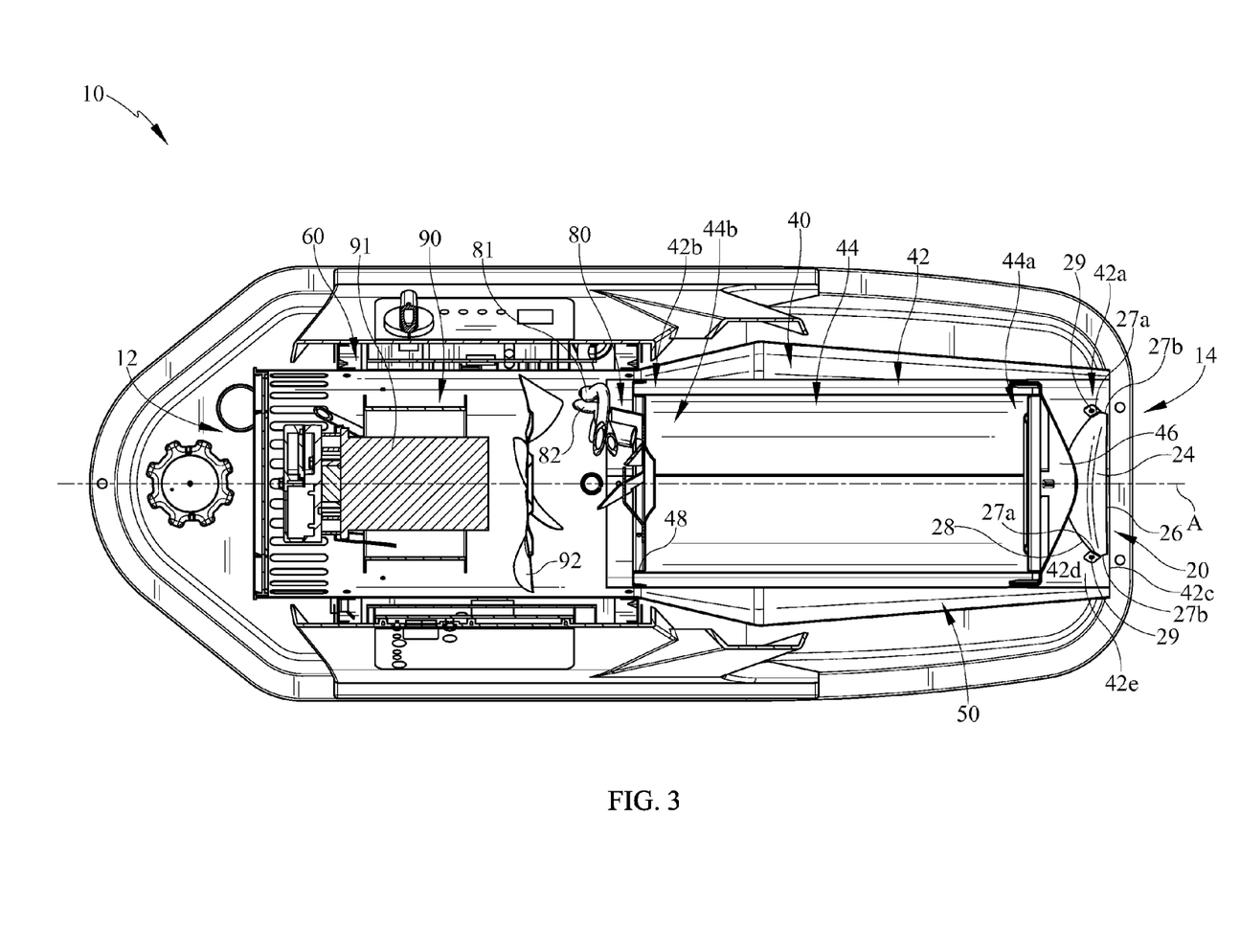
FIG. 3 is a sectional view of the heating unit of FIG. 1 taken along line 3-3.

Housing 50 is generally cylindrical and supports a combustion chamber assembly 40, best shown in FIG. 3. Housing 50 and/or combustion chamber assembly 40 may be a variety of different shapes, sizes, configurations, constructions, and still be within the scope of the embodiments. Combustion chamber assembly 40 includes a cylindrical outer shell or heat shield 42 and a cylindrical inner shell or combustion chamber 44 therewithin. Combustion chamber 44 is arranged substantially centrally of heat shield 42 so that an annular opening or radial spacing exists between combustion chamber 44 and heat shield 42 or between the chamber and housing 50. Heat shield 42 has two opposing ends 42a and 42b, and combustion chamber 44 has two opposing ends 44a and 44b corresponding with heat shield ends 42a, 42b, respectively. One end or inlet end 44b of the combustion chamber 44 is covered by a burner head assembly 80, and the opposing end or outlet end 44a of combustion chamber 44 is covered by the afterburner 46. Combustion chamber assembly 40 is spaced interiorly within housing 50 thereby defining the radial or annular spacing therebetween by, for example, brackets joined between housing 50 and heat shield 42. It is understood that the airflow cooling channel, annular openings, spacing, or gaps to allow airflow between the housing and heat shield, combustion chamber, or combustion chamber assembly may be a variety of sizes, shapes, dimensions radially or longitudinally, orientations, and constructions and still be within the scope of the embodiments.

During operation of heating unit 10, air is drawn from the surrounding environment through inlet end 12 of housing 50, heated, and then forced out of outlet end 14 to heat the surrounding environment. Burner head assembly 80 includes an air line 82 in fluid communication with the motor and pump assembly 90. Motor 91 drives a fan 92 to draw air from the back of the unit or inlet end 12 in order to circulate or push air into and around a combustion chamber assembly 40 (FIG. 3). Air may be circulated through a rear plate 48 when entering combustion chamber assembly 40. A mixture of fuel and air is routed into the combustion chamber 44 through burner head assembly 80 where it is burned in a combustion process. The fuel may be delivered to the combustion chamber 44 through fuel line 81 in the form of oil droplets formed by an atomizing process. Regardless of the atomizing process, however, incomplete combustion may occur within the combustion chamber 44 due to non-uniformity in size of the fuel droplets or an uneven mixing of the fuel droplets with air. Combustion chamber outlet end 44a provides the discharge end for combustion chamber 44, and the afterburner 46 is positioned adjacent the outlet end 44a of the chamber 44 for burning fuel particles which are not burned within the combustion chamber 44 to reduce the likelihood that unburned fuel particles will be discharged from heater 10 and enter the surrounding environment. The air is heated and provides a stream of clean, hot air out of the exit or outlet end 14 of unit 10. Air circulated between the combustion chamber assembly 40 and housing 50 cools the burner head assembly 80, combustion chamber assembly 40, and housing 50.

Figure 4:
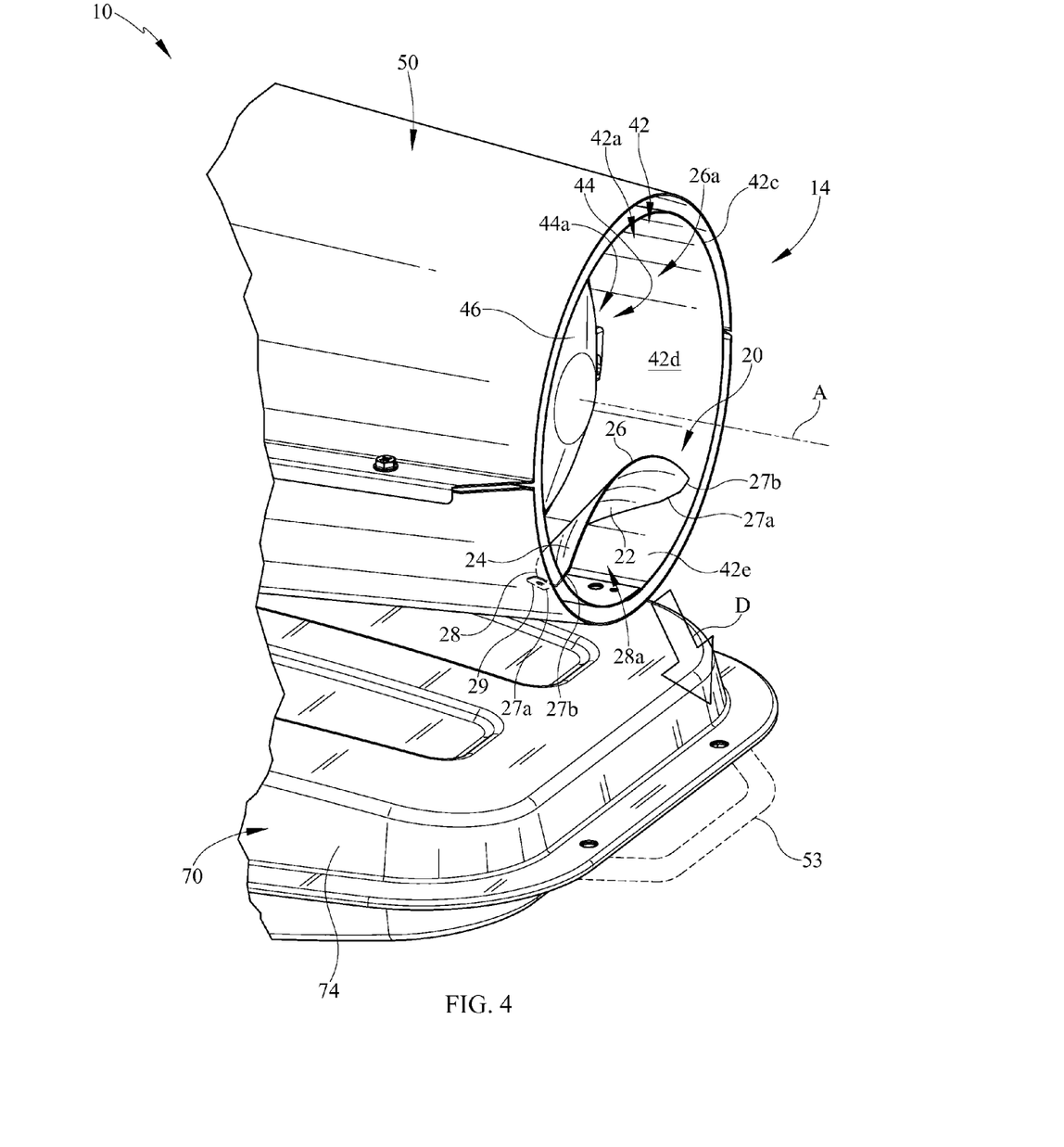
FIG. 4 is an enlarged, front perspective view of the outlet end of the heating unit of FIG. 1.
Figure 5A:
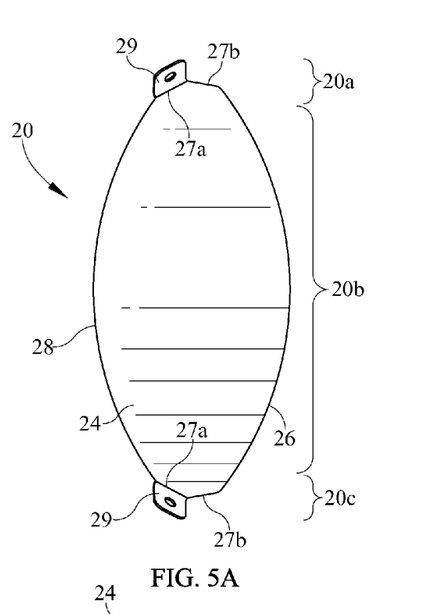
FIG. 5A is top view of the radiant heat blocker of FIG. 1.
Figure 5B:
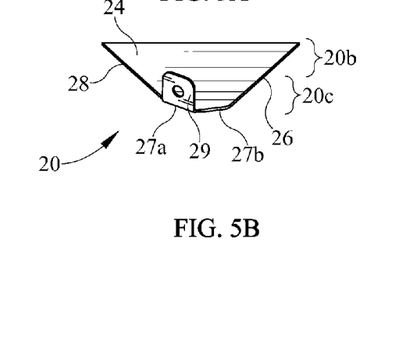
FIG. 5B is a side view of the radiant heat blocker of FIG. 5A.
Figure 5C:
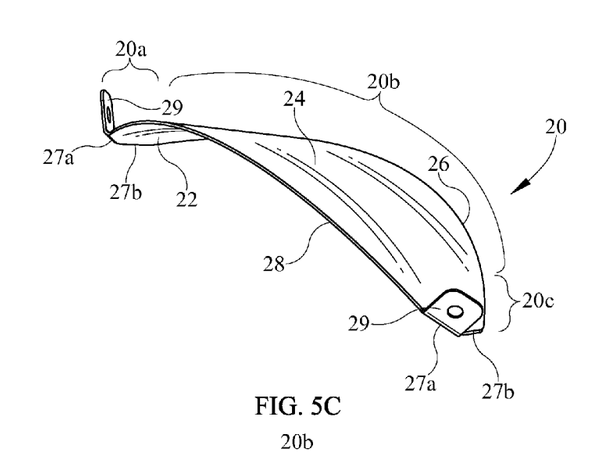
FIG. 5C is a rear, perspective view of the radiant heat blocker of FIG. 5A.
Figure 5D:
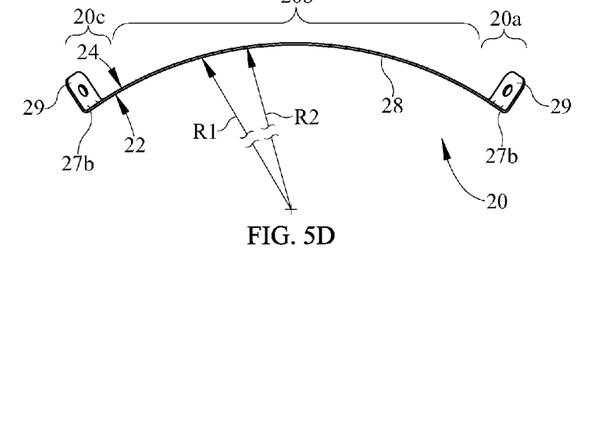
FIG. 5D is a front view of the radiant heat blocker of FIG. 5A.
Figure 6:
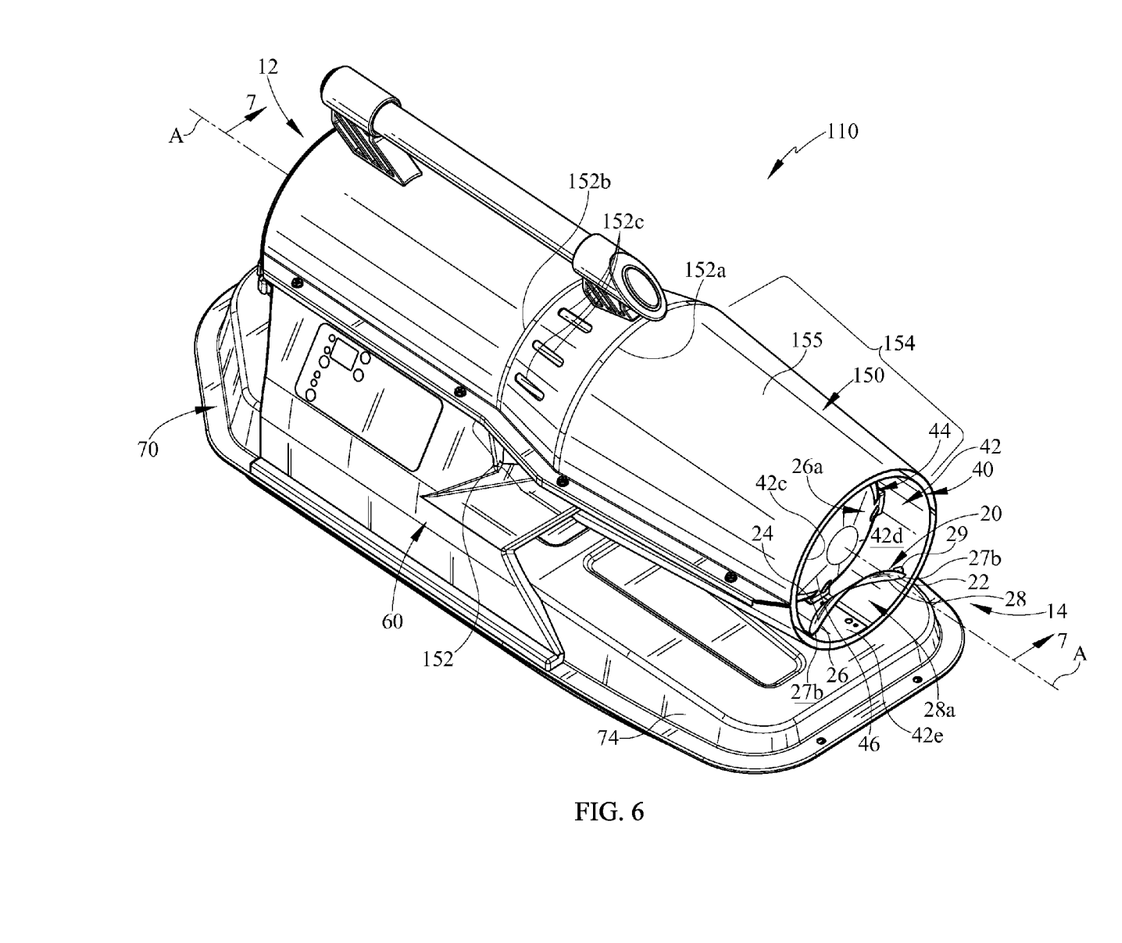
FIG. 6 is a front perspective view of a portable forced air heating unit according to another embodiment.

As shown in FIGS. 1-4, radiant heater blocker 20 is positioned in unit 10 within the air flow of outlet end 14 of the heater. Although, radiant heat blocker 20 is shown as a substantially arcuate plate or concave relative to the housing outlet end 14, it should be understood that radiant heat blocker 20 may be a variety of shapes and sizes. Radiant heat blocker 20 is elongated between opposing ends 20a and 20c. Opposing ends 20a, 20c are interconnected by a middle section or portion 20b. Middle section 20b is larger or wider than opposing ends 20a, 20b, whereby radiant heat blocker 20 may taper towards one or both ends. An upper edge 26 and lower edge 28 of radiant heat blocker 20 may also be arcuate in shape as shown in FIG. 5A, and may be arcuate in opposing directions as shown. With opposing edges 26 and 28 each curving and thus tapering towards each end 20a and 20c, radiant heat blocker 20 may appear substantially oval in appearance. It is also understood that the upper and lower edge 26, 28 may be a variety of sizes, shapes, quantities, and constructions. For example, upper and lower edges may be arcuate and be substantially parallel to each other. Interconnecting each end of the upper and lower edges 26, 28, respectively, may be one or more sidewalls 27a and 27b. As shown in FIGS. 3-5D, a mounting tab 29 may extend from each sidewall 27a at each opposing blocker end 20a and 20c and connects to combustion chamber assembly 40. Radiant heat blocker 20 has a front side surface 22 facing towards outlet end 14 of unit 10 and a rear side surface 24 facing the inlet end 12 of unit 10 (FIGS. 4 and 5D). Front side surface 22 may be arcuate in shape and may have a first radius R1 (FIG. 5D). Rear side surface 24 may also be arcuate in shape and may have a second radius R2, with first radius R1 being smaller than second radius R2. Each end 20a and 20c of radiant heat blocker 20 is shown in the figures mounted at lower shell or portion 42e of heat shield 42 or specifically an inner surface 42d of the heat shield at the discharge or outlet end 42c. As shown in FIGS. 1-4, one embodiment of the radiant heat blocker 20 may be angled relative to the longitudinal wall of heat shield 42, or transverse to the laminar flow or longitudinal axis A. It is understood that radiant heat blocker 20 may be at least partially substantially perpendicular to the heat shield wall or axis A. As shown in the figures, radiant heat blocker 20 extends radially inwardly from heat shield inner surface 42d and angles towards outlet end 14 or heat shield outlet end 42c. Thereby lower edge 28 is longitudinally, along axis A, to be closer to chamber 44 or afterburner 46. As such, upper edge 26 is longitudinally closer to the heat shield outlet end 42c. Radiant heat blocker 20 may also be described as a chord of the generally cylindrical shaped heat shield 42, whereby lower edge 28 and upper edge 26 is spaced a distance from the heat shield inner surface creating a lower opening 28a and an upper opening 26a, respectively. It is understood that the radiant heat blocker 20 may define any number of openings within the combustion chamber assembly.

Further, although radiant heat blocker 20 is shown in detail in the drawings, it merely represents one embodiment, and it is to be understood that there are a variety of shapes, dimensions, quantities, positions within the combustion chamber assembly or unit, compositions, and constructions which may be used and still be within the scope of these embodiments.

In operation, radiant heat blocker 20 effectively reduces radiant heat in one or more predetermined directions from outlet end 14 of the unit 10 while minimizing the effects on the heated laminar air flow exiting the heater unit. Heating unit 10 in operation circulates heated air from the unit in a substantially laminar air flow. However, radiant heat emitted from the outlet end 14 may undesirably heat portions of unit 10 and/or the surrounding environment resulting in damage or excessively high temperatures. Radiant heat blocker 20 absorbs radiant heat emitted from the combustion chamber assembly 40 and/or afterburner 46 to minimize the radiant heat in one or more predetermined directions from the unit 10. The embodiment shown in the figures, illustrates the radiant heat blocker 20 positioned on the lower portion of the combustion chamber assembly reduces the radiant heat emitted in the downwardly direction D (FIG. 4). By reducing the radiant heat in the downwardly direction D, the surrounding environment, such as the floor or ground, or portions of the heater is exposed to a reduced amount of radiant heat that could have otherwise caused undesirable damage or excessive heat. For example, as shown in broken lines in FIG. 4, a handle 53 may be positioned below outlet end 14 of unit 10 whereby the radiant heat blocker 20 would minimize the heat absorbed by the handle.

As shown in FIGS. 6-9, a housing 150 may include a longitudinal or divergent section 152 in the axial direction of the air flow of a heating unit 110. As such, the divergent section 152 of the housing results in an expansion area that correspondingly increases the annular or radial spacing/gap between the housing and the combustion chamber 44 and/or heat shield 42. The divergent section 152 includes an inlet end 152a and an outlet end 152b. Divergent section inlet end 152a has a smaller diameter towards the unit inlet end 12 than the divergent section outlet end 152b towards the unit outlet end 14. Although it is shown in detail as a straight taper, the divergent section 152 may be a variety of shapes or contours such as but not limited to arcuate and still diverge or create an expansion area in the direction of the air flow through the unit.

Figure 1:
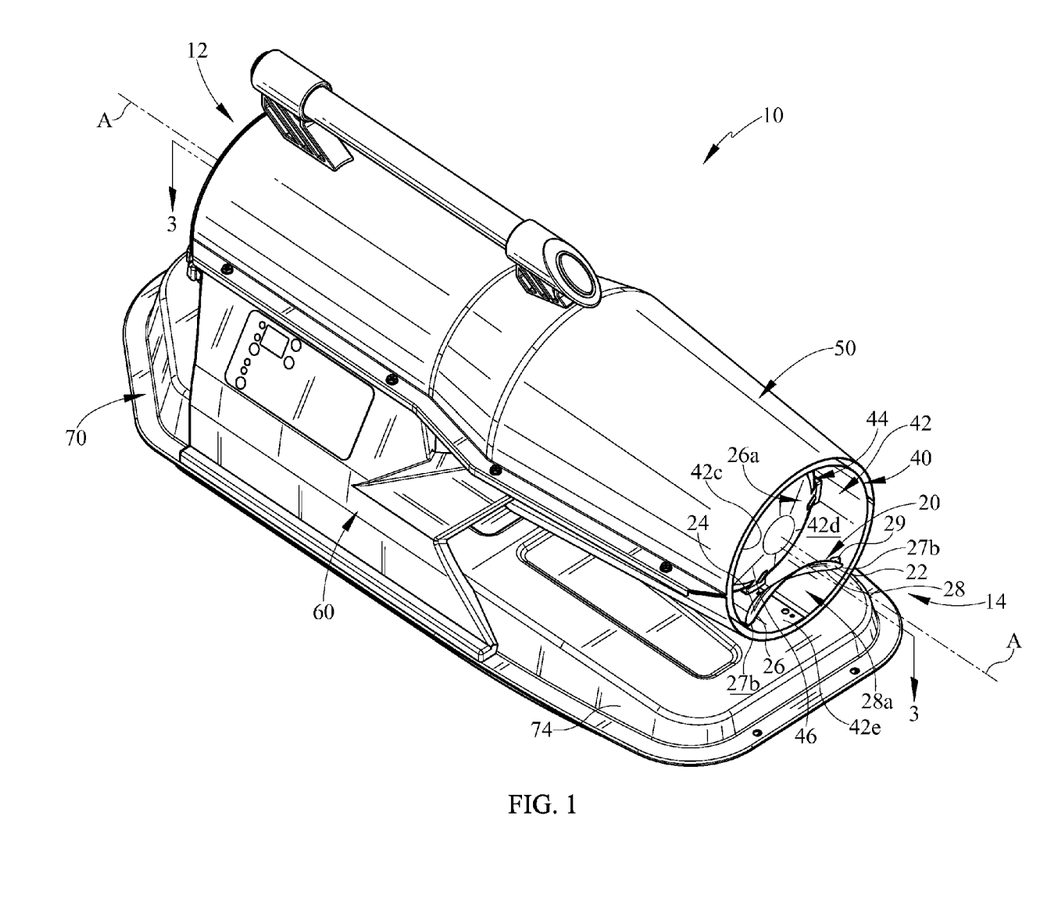
FIG. 1 is a front perspective view of a portable forced air heating unit according to one embodiment.
Figure 2:
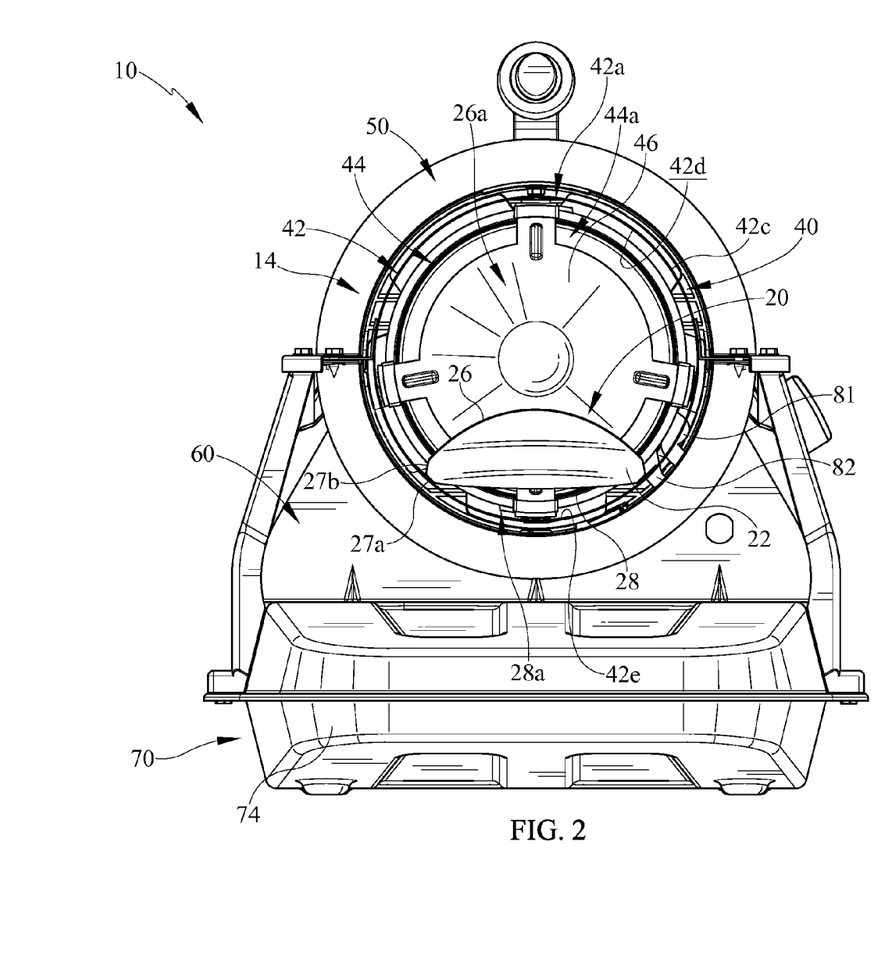
FIG. 2 is a front view of the heating unit of FIG. 1.
Figure 7:
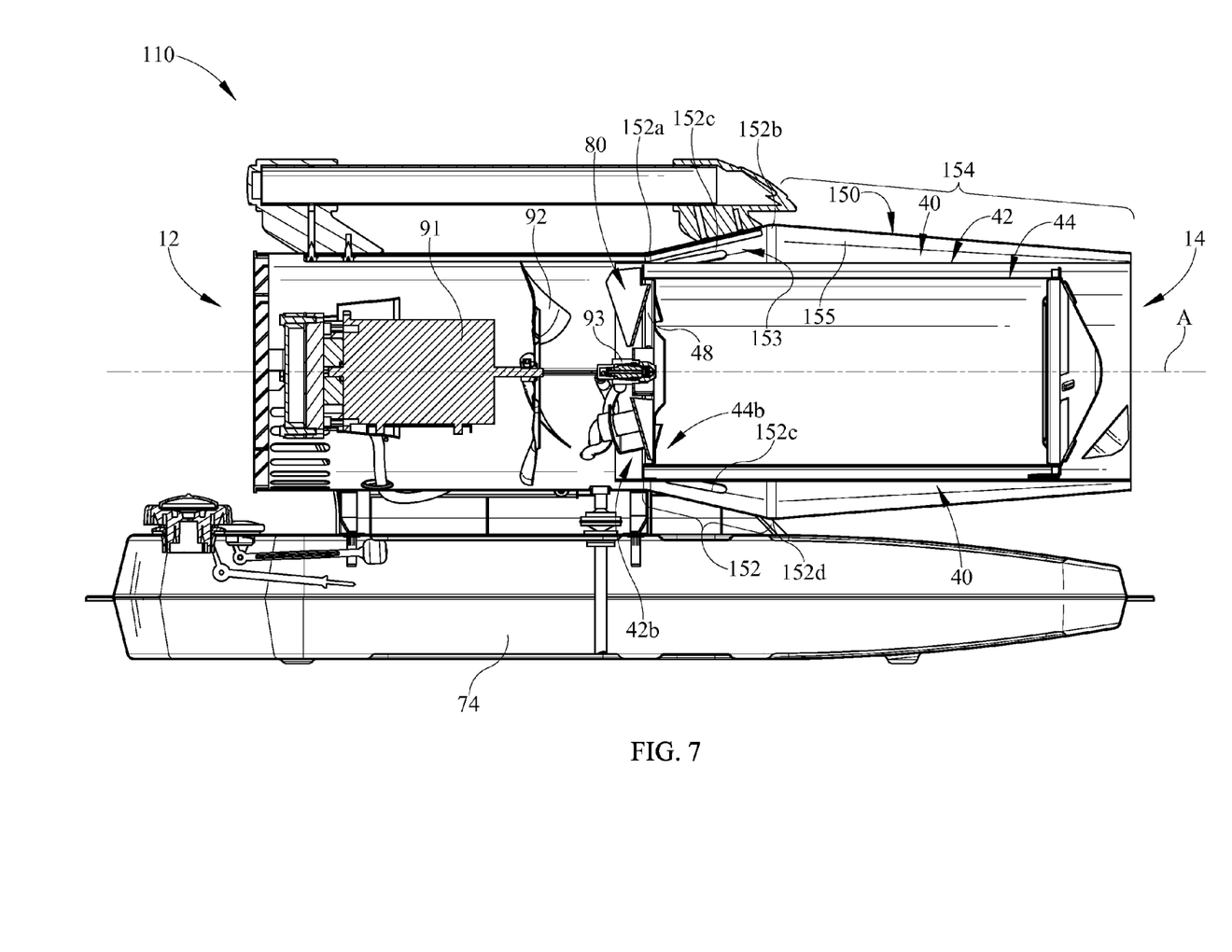
FIG. 7 is a sectional view of the heating unit of FIG. 6 taken along line 7-7.
Figures 8A, 8B:
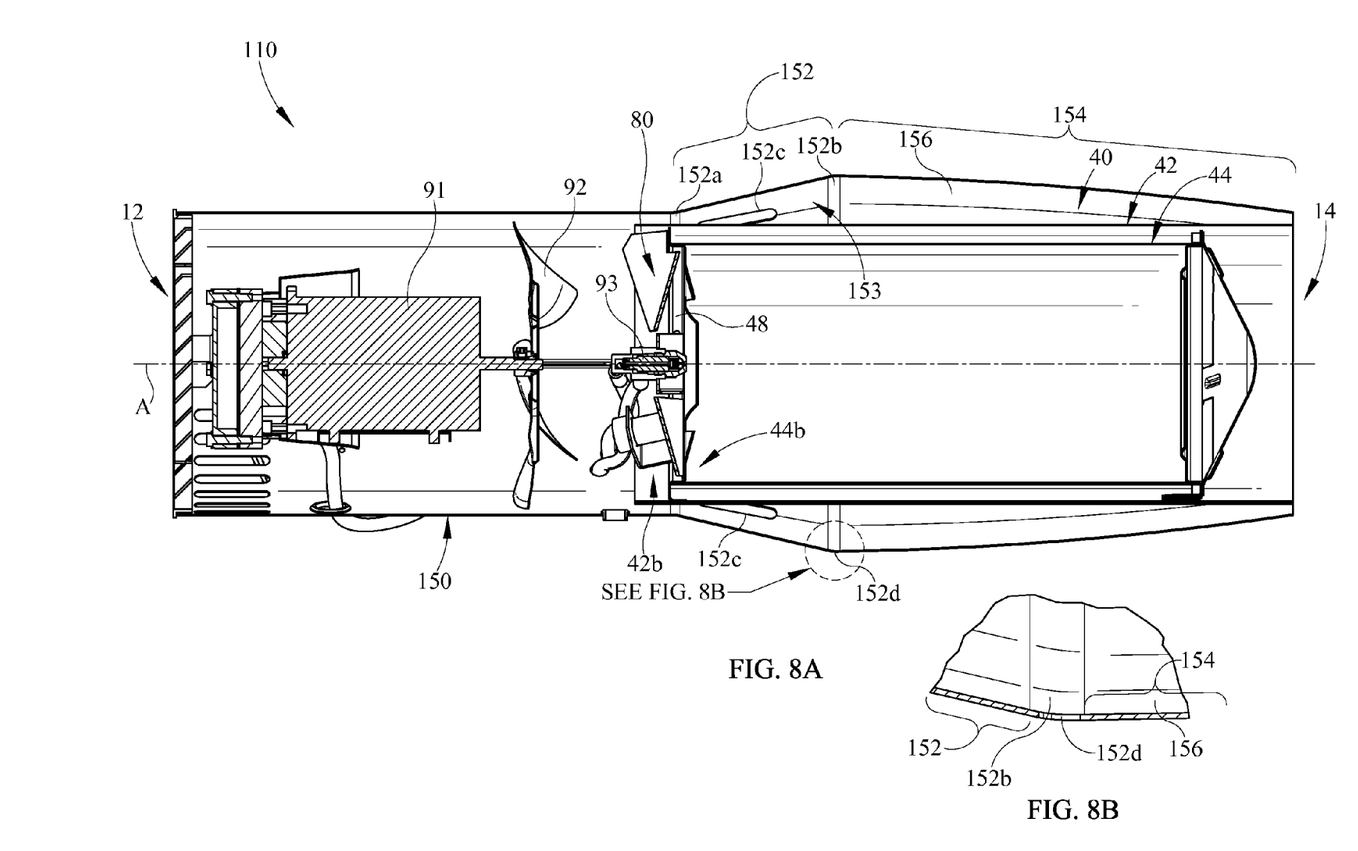
FIG. 8A is a sectional view of a heating unit according to another embodiment of the housing with the tank assembly and controls compartment removed.
FIG. 8B is an enlarge view of the housing of FIG. 8A illustrating a drainage opening therethrough.
Figure 9:
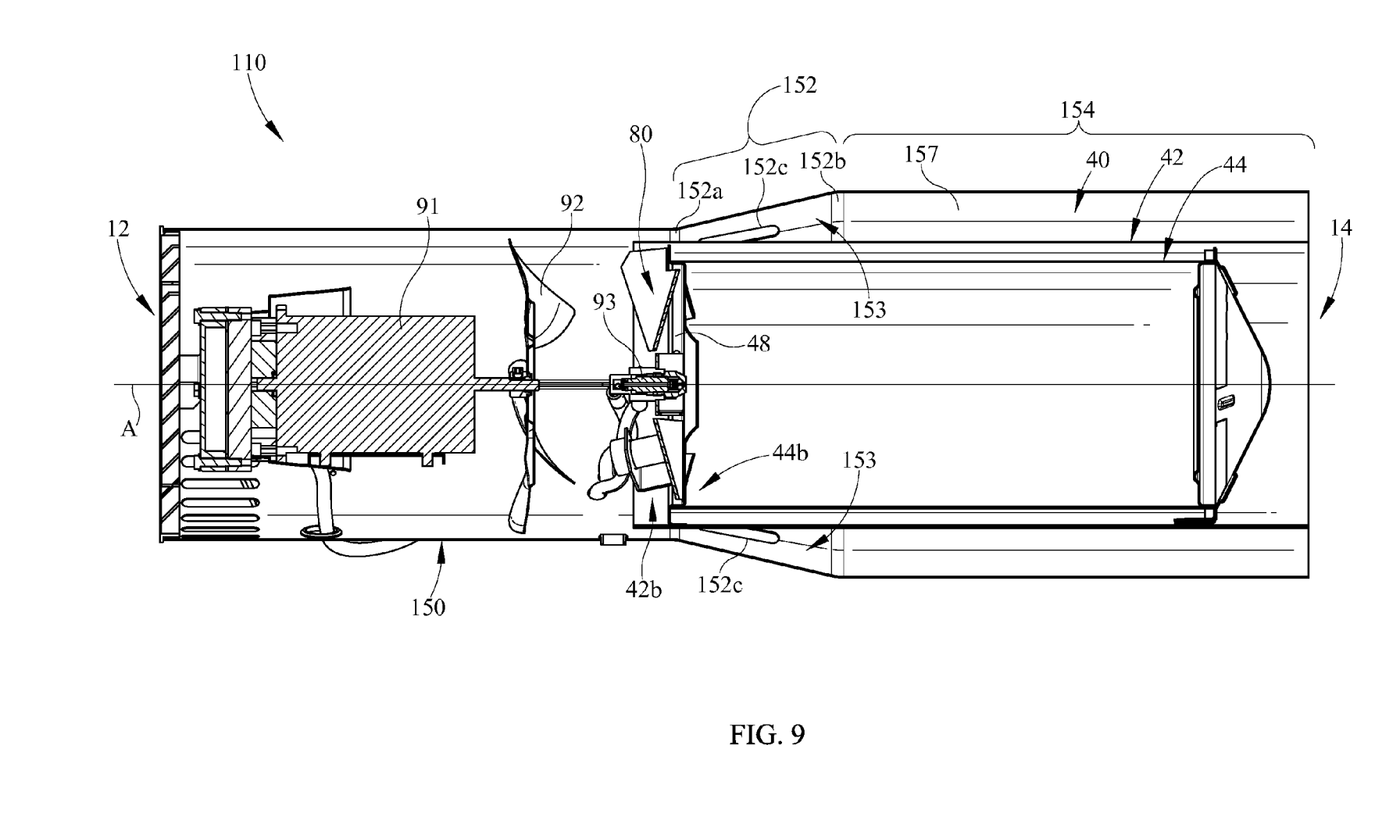
FIG. 9 is a sectional view of a heating unit according to another embodiment of the housing with the tank assembly and controls compartment removed.

Divergent section 152 is shown as axially overlapping the combustion chamber assembly 40 or stated otherwise as longitudinally beginning after the combustion chamber assembly 40 begins in the direction of the air flow from the inlet end 12 to the outlet end 14. As such, the one embodiment shown illustrates that the divergent section inlet end 152a is positioned after heat shield 42 begins in the direction of air flow. Therefore the diameter of the housing inlet end 12 may be substantially constant for a length overlapping the heat shield 42, combustion chamber 44, or combinations thereof. Divergent section inlet end 152a could also be described as being substantially axially aligned with the beginning of the combustion chamber inlet end 44b or rear plate 48. The divergent section 152 continues for a predetermined length longitudinally along the axis to the divergent section outlet end 152b and may transition to a variety of housing discharge ends 154. For example, the discharge end 154 may be tapered 155 in shape (FIGS. 6 and 7), arcuate 156 in shape (FIG. 8), or straight 157 walled (FIG. 9), or any combination thereof. As such, the tapering discharge end 154 of the housing results in a converging area that correspondingly reduces the annular or radial spacing/gap between the housing discharge end and the combustion chamber 44 and/or heat shield 42. The divergent section 152 may also have one or more apertures 152c therein. These apertures 152c as shown are elongated in the direction of air flow, but it is to be understood that the apertures 152c may be in a variety of positions relative to the divergent section, quantities, shapes, sizes, and construction. For example, the apertures 152c may be positioned on one or the other of the upper or lower shells of the housing divergent section or completely removed from the housing (FIGS. 1 and 3). Further, divergent section 152 may have one or more drainage holes or openings 152d located at the bottom side or portion of the housing (FIGS. 7-8B). The drainage opening 152d may allow accumulated water within housing 150 to drain or force an air and water mixture out of the unit during operation.

As motor 91 of the motor and pump assembly drives a fan 92 to draw air from the back of the unit or inlet end 12 in order to circulate or push air into and around a combustion chamber assembly 40 (FIG. 7). The moving air creates a pressure differential in the burner head assembly 80 causing fuel to be drawn from the fuel tank 74. Air may be circulated through rear plate 48 when entering combustion chamber assembly 40. An ignitor and spark plug ignites the fuel and air mixture or source of the nozzle 93 within the combustion chamber 44. The air is heated and provides a stream of clean, hot air out of an exit or outlet end 14 of unit 110. Air circulated between the combustion chamber assembly 40 and housing 150 cools the burner head assembly 80, combustion chamber assembly 40, and housing 150. In operation, a radial gap or annular spacing 153 between housing divergent section 152 and the heat shield 42 and/or chamber 44 reduces the radiant heat absorbed by the housing 150 thereby cooling the housing and heat shield. Further, the high velocity air flow before the divergent section 152, in the direction of the air flow towards the housing outlet end, transitions to a lower velocity within gap 153 of the divergent section thereby creating a low pressure area. This low pressure draws cooler air from the surrounding environment outside the unit into the apertures 152c of the divergent section 152 and continues out with the forced air between housing 150 and heat shield 42 thereby reducing the temperature of the heat shield and housing.

Further, although divergent section 152 is shown in detail in the drawings, it merely represents one embodiment, and it is to be understood that there are a variety of positions axially along the combustion chamber assembly 40, combustion chamber 44, heat shield 42, or unit, shapes, dimensions, quantities, compositions, and constructions which may be used and still be within the scope of these embodiments. For example, the divergent section 152 of the housing may not axially start at the combustion chamber end 44b, but before or after. For another example, although the divergent section circumscribes the entire housing, the divergent section may circumscribe only a portion of the circumference of the housing such as one or more divergent sections spaced or equidistantly spaced about the axis of the housing.

Figure 10A:
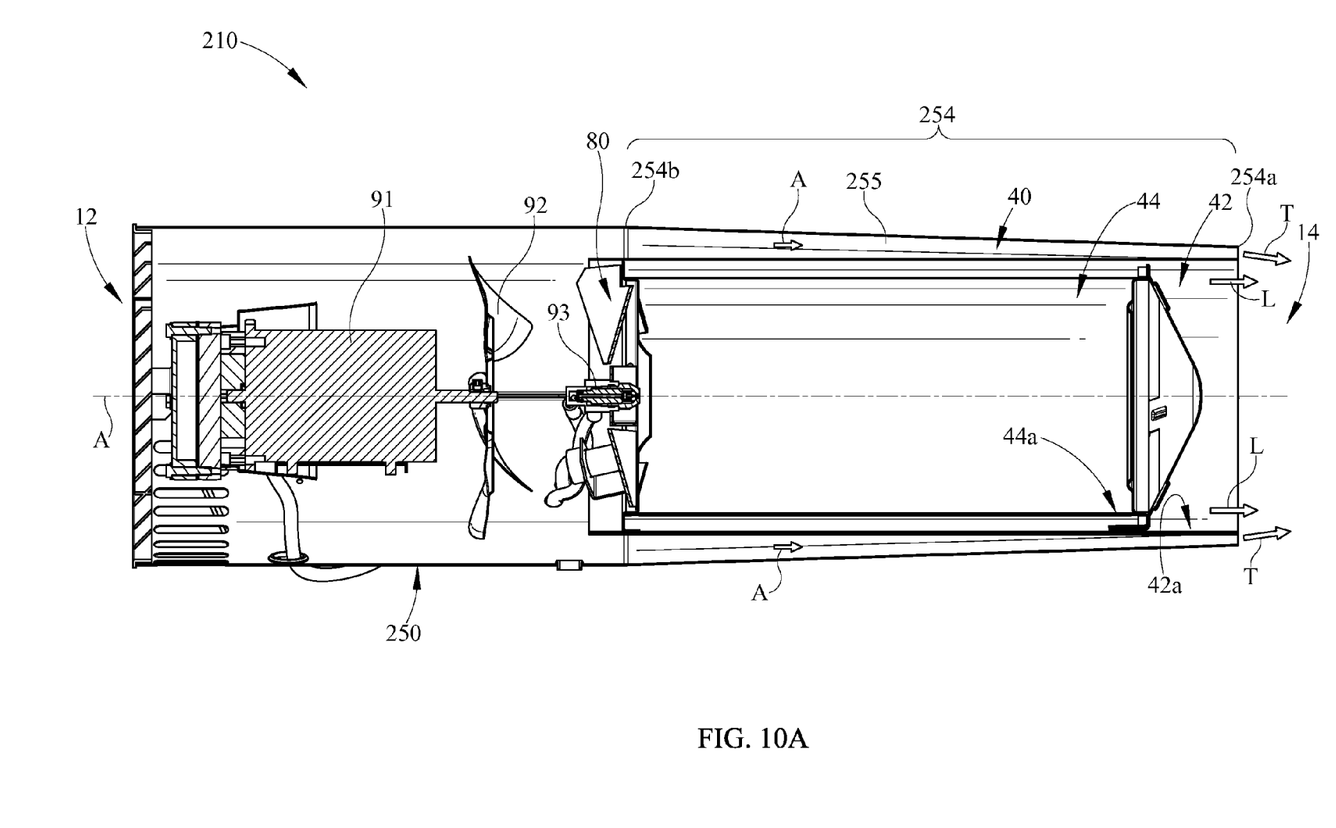
FIG. 10A is a sectional view of a heating unit according to another embodiment of the housing with the tank assembly and controls compartment removed.
Figure 10B:
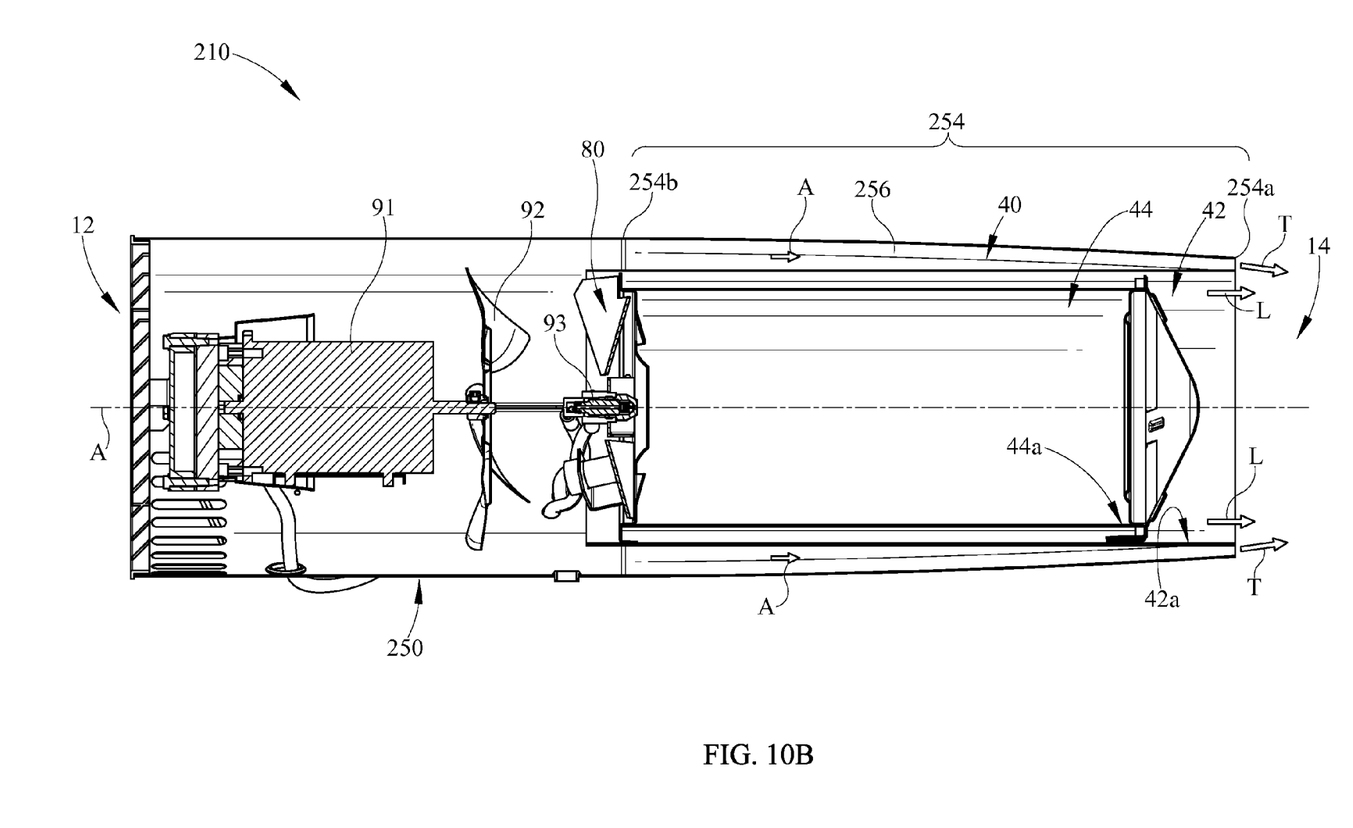
FIG. 10B is a sectional view of a heating unit according to another embodiment of the housing with the tank assembly and controls compartment removed.

As shown in FIGS. 10A and 10B, another embodiment of a distal or discharge end 254 at the outlet end 14 of an outermost wall or housing 250 may be tapered in the direction of the air flow within unit 210. As such, the tapering discharge end 254 of the housing corresponding reduces the annular or radial airflow spacing/gap between the housing discharge end 254 and the combustion chamber 44 and/or heat shield 42. Further, as shown an annular space may exist between the heat shield and combustion chamber. The discharge end 254 has an inlet end 254b and an opposing outlet end 254a, with the inlet end 254b having a larger diameter than the outlet end 254a. It is also shown that the outlet end 254a is larger than the diameter of the heat shield outlet end and combustion chamber outlet end. Although it should be understood that the discharge end outlet end diameter may be smaller than one or both of the combustion chamber and heat shield outlet end diameters. Although it is shown in detail as a straight taper 255 in FIG. 10A, the discharge end 254 may be a variety of shapes or contours such as, but not limited to, arcuate 256 in shape as shown in FIG. 10B and still be tapered. As shown in the embodiments of FIGS. 10A and 10B, discharge end 254 extends for a length along housing 250 and terminates and may not extend past the heat shield end 42a or axial extent of the combustion chamber assembly 40 thereby reducing the absorption of radiant heat by the housing. Alternatively as shown, the discharge end 154 is longitudinally offset from the fuel source, burner head 80, or nozzle 93. In operation as shown in FIGS. 10A and 10B, the discharge end 254 increases the velocity of the air flow A between the housing 250 and the heat shield 42 and/or chamber 44 and may also direct the exiting cool air flow in a direction transverse T to the generally laminar air flow L exiting the combustion chamber 44 and/or heat shield 42. The transverse cool air flow T created by the discharge end 254 increases turbulence to the exiting laminar air flow L of the unit to create an air mixture with a more uniform temperature while still effectively projecting the heated forced air to a predetermined distance away from the unit. Thus, reducing any undesirable hot air region or zone proximate the outlet end 14 of the housing.

Further, although discharge end 254 is shown in detail in the drawings, it merely represents one embodiment, and it is to be understood that there are a variety of positions along the unit, shapes, dimensions such as axial length, quantities, compositions, and constructions which may be used and still be within the scope of these embodiments. For example, although discharge end 254 is shown in detail extending from a constant diameter housing inlet end, it may be combined with a variety of housing sections such as, but not limited to, the divergent section 152 as shown in FIGS. 1, 3, 4, and 6-8. For example as shown if a heat shield is present in the combustion chamber assembly, one position of the discharge end outlet end may be flush with the heat shield outlet end and may extend downstream of the combustion chamber distal end. Alternatively, the discharge end may extend upstream or downstream of the terminating end of one or both of the combustion chamber or heat shield. Also, the narrowing of the distal end may be a one or more portions or sections of the housing circumference and not limited to the 360 degrees as shown. In addition, the combustion chamber may be of a variety of positions along the unit or housing, shapes, dimensions such as axial length, quantities, compositions, and constructions which may be used and still be within the scope of these embodiments. The heat shield may be of a variety of positions along the unit or housing, shapes, dimensions such as axial length, quantities, compositions, and constructions which may be used and still be within the scope of these embodiments.

It is understood that while certain embodiments of the invention have been illustrated and described, it is not limited thereto except insofar as such limitations are included in the following claims and allowable functional equivalents thereof.

I claim:

1. A portable forced air heating unit comprising:
   an elongated outer housing having an inlet end and an opposing outlet end;
   a fan positioned within said housing between said inlet end and said outlet end;
   a fuel source within said housing and downstream of said fan;
   a heat shield positioned within said housing and downstream of said fan, wherein said heat shield includes an inlet end adjacent said fan and an outlet end adjacent said housing outlet end;
   a combustion chamber in fluid communication with said fuel source and positioned within said heat shield downstream of said fan, wherein said combustion chamber includes an inlet end adjacent said fan and an outlet end adjacent said housing outlet end;
   an expansion area adjacent said fuel source and between said housing and said heat shield;
   a converging area downstream of said expansion area and between said housing and said heat shield; and
   wherein said fan forces air downstream into said expansion area and said converging area before exiting said outlet end of said housing.

2. The portable forced air heating unit of claim 1 wherein said heat shield extends from adjacent said fuel source towards said outlet end.

3. The portable forced air heating unit of claim 1 wherein said housing defining said expansion area tapers outwardly away from said heat shield.

4. The portable forced air heating unit of claim 1 wherein said housing defining said conversion area tapers inwardly towards said heat shield.

5. The portable forced air heating unit of claim 1 wherein said housing includes apertures therethrough adjacent said expansion area.

6. The portable forced air heating unit of claim 1 wherein said expansion area is spaced downstream from an inlet end of said heat shield.

7. The portable forced air heating unit of claim 1 wherein heat shield is linear along a longitudinal axis of said housing.

8. The portable forced air heating unit of claim 1 wherein said expansion area includes a first annular opening between said housing and said heat shield upstream from a second annular opening between said housing and said heat shield, wherein said first annular opening is smaller than said second annular opening.

9. A portable forced air heating unit comprising:
   an elongated outer cylindrical housing having an inlet end and an opposing outlet end;
   a fan positioned within said housing;
   a fuel source within said housing downstream of said fan;
   an annular combustion chamber positioned within said housing downstream of said fan, wherein said combustion chamber includes an inlet end adjacent said fuel source and an outlet end adjacent said outlet end of said housing;
   said housing having an inlet section, a divergent section, and an outlet section;
   said housing inlet section positioned adjacent said inlet end of said housing and said outlet section positioned adjacent said outlet end of both said housing and said combustion chamber and said divergent section is positioned between said inlet section and said outlet section, wherein said divergent section is positioned adjacent said fuel source;
   said divergent section having an inlet end and an opposing outlet end, wherein said inlet end of said divergent section has a first diameter and connects with said inlet section, wherein said outlet end of said divergent section has a second diameter and connects with said outlet section, said first diameter is smaller than said second diameter; and
   said outlet section extends downstream from said outlet end of said divergent section, wherein said outlet section tapers inwardly from said outlet end of said divergent section towards said outlet end of both said housing and said combustion chamber, wherein said fan forces air both downstream through said combustion chamber inlet end to said combustion chamber outlet end and downstream through a spacing between said combustion chamber and both said divergent section and said outlet section of said housing before exiting said outlet end of said housing.

10. The portable forced air heating unit of claim 9 wherein said combustion chamber is linear along said housing.

11. The portable forced air heating unit of claim 9 further comprising a heat shield between said combustion chamber and said housing, wherein said heat shield is linear along said housing.

12. The portable forced air heating unit of claim 9 wherein said outlet section extends about a portion of a circumference of said housing.

13. The portable forced air heating unit of claim 9 wherein said outlet section of said housing is a straight taper from said outlet end of said divergent section to an outlet end of said outlet section.

14. The portable forced air heating unit of claim 9 wherein said divergent section includes one or more apertures therethrough.

15. The portable forced air heating unit of claim 9 wherein an outlet end of said outlet section is substantially longitudinally flush with an outlet end of a heat shield, wherein said heat shield is positioned between said combustion chamber and said housing.

16. A portable forced air heating unit comprising:
   an elongated outer cylindrical housing having an inlet end and an opposing outlet end;
   a fan positioned within said housing;
   a fuel source within said housing downstream of said fan;
   an annular heat shield spaced interiorly within said housing extending from adjacent said fuel source towards said outlet end of said housing, wherein said housing and said heat shield define an airflow cooling channel therebetween that is downstream of said fan;
   an annular combustion chamber spaced interiorly within said heat shield extending from adjacent said fuel source towards said outlet end of said housing; and wherein said airflow cooling channel extends for a longitudinal distance from adjacent said fuel source towards said outlet end of said housing, said longitudinal distance includes an upstream longitudinal distance adjacent said fuel source and a downstream longitudinal distance adjacent said outlet end of said housing, said airflow channel increases in size in the direction of airflow within said airflow channel during said upstream longitudinal distance and said airflow channel decreases in size in the direction of air flow within said airflow channel during said downstream longitudinal distance.

17. The portable forced air heating unit of claim 16 wherein said housing defining said airflow channel along said downstream longitudinal distance decreases in diameter in the direction of airflow.

18. The portable forced air heating unit of claim 16 wherein said housing defining said airflow channel along said upstream longitudinal distance includes apertures therethough.

19. The portable forced air heating unit of claim 16 wherein said heat shield includes an outside diameter, said heat shield outside diameter is constant along said longitudinal distance from adjacent said fuel source to said outlet end.

20. The portable forced air heating unit of claim 16 wherein said housing defining said airflow channel along said upstream longitudinal distance increases in diameter in the direction of airflow.

\* \* \* \* \*